Patented Mar. 29, 1938 2,112,354

UNITED STATES PATENT OFFICE 2,112,354

TREATMENT OF OILS OF THE TYPE OF CHINA-WOOD OIL AND OITICICA OIL

Alfonso M. Alvarado, Wilmington, Del., assignor to E. I. du Pont de Nemours & Company, Wilmington, Del., a corporation of Delaware No Drawing. Application April 21, 1936, Serial No. 75,554

9 Claims. (Cl. 87—12)

This invention relates to the treatment of China-wood and similar oils, and more particularly to the preparation of coating compositions containing China-wood oil which exhibit resistance to frosting and "gas checking" and which have exceedingly fast drying properties.

It is well known that China-wood oil has many desirable properties as an ingredient of varnishes. Unfortunately, however, it has one property which greatly detracts from its value. This resides in the fact that varnishes prepared from this oil, unless the oil is properly cured, dry with the formation of a close network of fine cracks or wrinkles. This is called frosting and has long been known to be typical of China-wood oil varnishes. Under certain circumstances, the varnish film dries with the formation of large wrinkles.

It is well known that when China-wood oil is cured by heat-treatment for varying lengths of time, and the bodied oil immediately reduced with a varnish solvent to a brushing or spraying viscosity, followed by immediate addition of drier, a product is obtained which requires from about one to two hours to dry to the dust-free stage, depending upon the conditions under which the test is conducted.

I am aware that it has been proposed by Max Oppenheimer in Farbe und Lack, 1926, pages 28—29, to add phenols and amines to heat-treated China-wood oil to inhibit frosting but this improvement has heretofore always been accompanied by a marked decrease in the drying properties of the oil. In the publication mentioned, Oppenheimer states that beta-naphthol is an exception to this rule, since when used in conjunction with a drier, such as cobalt linoleate, it actually accelerates the drying properties of China-wood oil. Therefore, I make no claim to the exact method disclosed therein. However, I have made the unexpected and valuable discovery that by proceeding as will be described herein, I obtain China-wood oil compositions which dry exceedingly fast, employing phenols or amines which according to Oppenheimer and others, normally retard drying. I have also made the further unexpected discovery that these exceedingly fast drying China-wood oil compositions dry to smooth, glossy films which are free of any evidences of frosting or wrinkling.

An object of the present invention is the treatment of China-wood and similar oils so as to improve their drying properties and resistance to wrinkling upon drying.

Another object of this invention is the provision of a treatment for China-wood oil so that its drying time is greatly reduced.

A still further object of this invention is the production of coating compositions containing China-wood oil characterized by a very short drying time, and greatly improved resistance to gas-checking, when dried under normal or adverse conditions. Other objects will appear hereinafter.

These objects are accomplished by aging China-wood oil in the presence of thinner and absence of a drier.

In the practice of my invention, the China-wood oil is heated at 250 to 500° F. to the desired viscosity which may range from 3 or 4 poises to as high as 150 poises at 77° F., depending upon the use to which the oil is to be put. This heat treatment is carried out in an open kettle or in any other suitable vessel wherein the oil is in contact with air. After this heat treatment, the oil is diluted with a solvent, which may be any of those commonly used in varnishes such as mineral spirits, until the viscosity has been reduced to the order of 1 to 5 poises at 77° F. The reduced heat-treated oil is then aged for a period of two to four weeks, preferably under such conditions that the oil is in contact with air during the aging period. Such conditions may be obtained by aging it in partially filled containers, blanketed with air, or in full containers with a loosely fitting lid or stopper. After the aging period has been completed, a drier is added to the oil, preferably about 0.03% cobalt as a solution of cobalt linoleate. I may also use manganese linoleate or other driers, for example those well known in the art, such as compounds of lead, cerium, iron, and the like.

Oils treated in accordance with my process are not to be confused with oils treated by processes known to the art which are used in preparing China-wood oil stand oils in which case the bodied oils are aged in the absence of a solvent, and in the presence or absence of a drier. Such stand oils, regardless of how long they have been aged, still require on the average from one to one and one-half hours to become dust-free in the presence of 0.03% cobalt. China-wood oils treated in accordance with my process are also not to be confused with solvent-extracted China-wood oils, such as those known to the trade as "Tekaols" which require about one hour to dry to the dust-free stage in the presence of 0.03% cobalt. It is also to be understood that oils treated in accordance with my process are different from oils containing excessively large quantities of lead and manganese driers, with or without addition of cobalt drier, to bring about rapid drying, since such oils may wrinkle badly upon drying.

The following examples will illustrate how the invention may be carried out. However, it will be understood that the following examples are given by way of illustration only and not by way of limitation:

Example I 100 parts of China-wood oil are brought to a temperature of 450° F. This usually takes about 20 minutes. The oil is maintained at this temperature for 20 minutes, at which time the viscosity of the oil will have increased to 15 or 20 poises at 77° F. While the oil is still hot, 30 parts of mineral spirits are added with the result that a reduction of viscosity to about 1 poise at 77° F. takes place. The reduced heat-treated oil is then aged for a period of 4 weeks in contact with air. A drier consisting of a 0.03% solution of cobalt as cobalt linoleate is added to the aged oil solution. The product obtained by this treatment when applied to a surface will dry to the dust-free stage in about 15 to 20 minutes.

Example II 100 parts of China-wood oil are heated to a temperature of 300 to 400° F. and allowed to remain at this temperature for 20 minutes. The heat-treated oil is then reduced with mineral spirits as indicated in Example I. The oil solution is allowed to cool to about 70° F. and 3 parts of beta-naphthol, dissolved in a suitable solvent, are added and well mixed into the oil solution. The oil solution is aged for about 4 weeks, and a drier is then added as in Example I.

The product thus prepared dries dust-free in about 25 minutes, and is very resistant to gas-checking.

Example III 100 parts of China-wood oil are heated to 450° F., and held at this temperature for about 20 minutes. The oil is then removed from the fire, allowed to cool to between 300 and 400° F., and 3 parts of resorcinol are added, slowly, with stirring. After the resorcinol has completely dissolved, the oil is reduced to 60% solids with mineral spirits, and the solution allowed to age in contact with air for 4 weeks at room temperature. To the aged oil solution is then added 0.03% cobalt, based on the oil, as a solution of cobalt linoleate. The oil thus obtained dries to the dust-free stage in 15 to 20 minutes, and the film is very resistant to gas-checking.

The above experiment was repeated, except that the drier was added to the oil solution initially, and the solution then allowed to age 4 weeks in contact with air. The oil thus prepared required 120 minutes to dry to the dust-free stage.

Using the procedure outlined in the above example, I have found that the drying time of China-wood oil containing o-hydroxydiphenyl is reduced from 120 to 45 minutes; oil containing p-hydroxydiphenyl from 225 to 50 minutes; oil containing alpha-amino anthraquinone from 240 to 82 minutes; oil containing alpha-naphthylamine from 75 to 45 minutes; and oil containing beta-naphthylamine from 40 to 15 minutes.

In addition to the agents mentioned above, other phenols may be used; for example, p, p'-dihydroxydiphenyl, eugenol, catechol, and guaiacol. Likewise, other amines may be used such as phenyl-beta-naphthylamine, dibutylamine, ethylenediamine, butyl-didodecylamine, etc. Quinones have also been found useful in the preparation of fast drying China-wood oil compositions. The following quinones have been found to be particularly suitable: Anthraquinone, beta-methyl-anthraquinone, diamino-anthraquinone, benzanthrone, and beta-methylbenzanthrone. I have also found the fluoronone and benzil and compounds of this type may also be used.

While I have illustrated my invention with my preferred procedures, I may vary many of the ingredients or amounts without departing from the spirit of the invention. For example, instead of treating China-wood oil, I may treat raw oiticica or other oil which are characterized by frosting upon drying. The treatment may likewise be used in the case of linseed oil, soya bean oil, and other more commonly used drying oils. However, there would be no particular object in doing this since these oils do not stand in need of such treatment, inasmuch as they do not frost or wrinkle under ordinary conditions of drying. In Example II, I have indicated that beta-napthol may be used as a frosting inhibitor to the extent of about 3% of the oil undergoing treatment. This amount of inhibitor has been found to be very satisfactory. However, under special conditions, is may be found preferable to reduce it considerably, such as to ½%, and on the other hand it may be necessary to increase it to 5 or even 10%.

In general, as a result of a great number of experiments, it might be said that amines, compounds containing the carbonyl group attached to an aromatic ring such as anthraquinone or benzil and certain phenolic compounds, greatly accelerate the drying rate of films of heat-treated China-wood oil and may be satisfactorily used in the above-described process. In the case of the amines, the primary aromatic amines have a much greater effect than the aliphatic amines. It has also been found that if the basicity of the aromatic amine is decreased as for example by the introduction of a negative group into the ring, its effectiveness as drying accelerates is reduced. For example, China-wood oil treated with 2,5-dichloraniline or diphenylamine dries very much more slowly than oil treated with aniline. The effectivenes of phenolic compounds appears to depend on the relative position of the hydroxyl group. For example, beta-naphthol greatly accelerates the drying of the oil, while alpha-naphthol greatly retards it. Likewise, resorcinol is an accelerator while ortho- and para-hydroxydiphenyl are practically without effect, and hydroquinone greatly retards drying.

Although in the examples the thinner used has been mineral spirits, I desire it to be understood that in place thereof I may use other well known solvents used in paints and varnishes such as turpentine, Hi-Flash naphtha, solvent naphtha, turpentine substitutes, etc.

The films prepared from oil treated according to the present invention have been found to be equal or harder than the control even in cases where the drying took place very rapidly.

The term "dust-free" is one which is well known in the art and is usually considered to be the degree of dryness reached when no permanent impression is made on the film by drawing the finger-tips over it lightly.

The advantages of the herein disclosed invention are that China-wood oil may be treated by a simple and economical method which greatly decreases and, in some cases, entirely removes the tendency for the oil or varnishes prepared from the treated oil to wrinkle and gas-check under ordinary or adverse conditions of drying.

The oils treated in accordance with this invention, alone or in combination with natural and synthetic resins, pigments, dyes, and lakes, are highly useful in the production of coating compositions for wood, steel, stone, and other surfaces.

It is apparent that many widely different embodiments of this invention may be made without departing from the spirit and scope thereof; and, therefore, it is not intended to be limited except as indicated in the appended claims.

I claim:

1. In the process of treating China-wood oil the step which comprises heating the same in contact with air to 250° to 500° F., until the viscosity is between 3 and 150 poises, adding solvent thereto, and aging in contact with air.

2. In the process of treating China-wood oil to decrease its drying time, the step which comprises bodying said oil by heat-treatment at a temperature between about 250° F. and 500° F., in contact with air, adding solvent thereto, and then aging the oil solution in the absence of drier in contact with air for an extended period of time.

3. Process of treating China-wood oil which comprises heating said oil in contact with air until its viscosity has been increased to between 3 and 150 poises, reducing the same with a varnish solvent, and aging the solution in the absence of drier in contact with air for an extended period of time.

4. Process of treating China-wood oil which comprises heating said oil in contact with air to a temperature of 250° to 500° F., until the viscosity lies between 3 and 150 poises, reducing the heat-treated oil with a solvent, adding thereto an anti-wrinkling agent, and then aging the solution in the absence of drier in contact with air for an extended period of time.

5. Process of claim 4 in which the anti-wrinkling agent is selected from the class consisting of phenols, amines, and quinones.

6. Process of treating China-wood oil which comprises heating the same in contact with air to a temperature between 250 and 500° F. for 12 and 20 minutes, adding solvent until the viscosity has been greatly reduced, and adding thereto a phenol, and aging the solution in the absence of drier but in contact with air for an extended period of time.

7. Process of treating China-wood oil which comprises heating the same in contact with air to 450° F. maintaining the oil at this temperature for about 20 minutes, adding solvent in amount equal to about 30% of the oil, adding about 3% of a phenol, allowing the oil to age in contact with air for about 4 weeks, and adding thereto about 0.03% cobalt as linoleate.

8. In the process of treating China-wood oil to accelerate drying, the improvement which comprises bodying the oil by heating in contact with air until the viscosity is between 3 and 150 poises, adding solvent, and aging the oil in contact with air.

9. The process of treating drying oils which normally tend to frost upon drying to accelerate drying and to reduce frosting which comprises bodying such an oil by heating in contact with air until the viscosity is between 3 and 150 poises, adding solvent, and aging the oil in contact with air for an extended period of time.

ALFONSO M. ALVARADO.